United States Patent
Dey et al.

(10) Patent No.: US 10,751,881 B2
(45) Date of Patent: Aug. 25, 2020

(54) SYSTEM AND METHOD FOR EXECUTING FAULT-TOLERANT SIMULTANEOUS LOCALIZATION AND MAPPING IN ROBOTIC CLUSTERS

(71) Applicant: Tata Consultancy Services Limited, Mumbai (IN)

(72) Inventors: Swarnava Dey, Kolkata (IN); Swagata Biswas, Kolkata (IN); Arijit Mukherjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 360 days.

(21) Appl. No.: 15/900,880

(22) Filed: Feb. 21, 2018

(65) Prior Publication Data

US 2019/0030719 A1 Jan. 31, 2019

(30) Foreign Application Priority Data

Jul. 26, 2017 (IN) .............................. 201721026550

(51) Int. Cl.
*B25J 9/16* (2006.01)
*G05D 1/02* (2020.01)
*B25J 9/00* (2006.01)

(52) U.S. Cl.
CPC .......... *B25J 9/1682* (2013.01); *B25J 9/0084* (2013.01); *B25J 9/1674* (2013.01); *G05D 1/0274* (2013.01); *G05D 1/0295* (2013.01)

(58) Field of Classification Search
CPC combination set(s) only.
See application file for complete search history.

(56) References Cited

U.S. PATENT DOCUMENTS 9,026,248 B1 * 5/2015 Hickman .................. B25J 3/00
700/248

FOREIGN PATENT DOCUMENTS

WO WO-2009/040777 4/2009

OTHER PUBLICATIONS

Haoyao Chen Et Al, Localization for Multi-robot Formations in Indoor Environment, and IEEE/ASME Transactions on Mechatronics, the U.S., IEEE, Aug. 2010 (Year: 2010).*
Lynne E. Parker and Alliance: An Architecture for Fault Tolerant Multi Robot Cooperation, IEEE Transactions on Robotics and Automation, the U.S., IEEE, Apr. 1998 (Year: 1998).*

(Continued)

*Primary Examiner* — Abby Y Lin
*Assistant Examiner* — Renee LaRose
(74) *Attorney, Agent, or Firm* — Finnegan, Henderson, Farabow, Garrett & Dunner, LLP

(57) ABSTRACT

In current distributed simultaneous localization and mapping (SLAM) implementations on multiple robots in a robotic cluster, failure of a leader robot terminates a map building process between multiple robots. Therefore, a technique for fault-tolerant SLAM in robotic clusters is disclosed. In this technique, robotic localization and mapping SLAM is executed in a resource constrained robotic cluster such that the distributed SLAM is executed in a reliable fashion and self-healed in case of failure of the leader robot. To ensure fault tolerance, the robots are enabled, by time series analysis, to find their individual failure probabilities and use that to enhance cluster reliability in a distributed manner.

8 Claims, 8 Drawing Sheets

(56) References Cited

OTHER PUBLICATIONS

Kamburugamuve, S. et al. "Cloud-based Parallel Implementation of SLAM for Mobile Robots," *Proceedings of the International Conference on Internet of Things and Cloud Computing (ICC '2016)*, Cambridge, UK, Mar. 22-23, 2016; 12 pages.

Dey, S. et al. "Robotic SLAM—a Review from *Fog Computing and Mobile Edge Computing* Perspective," 2016 *Adjunct Proceedings of the 13th International Conference on Mobile and Ubiquitous Systems: Computing Networking and Services*, Hiroshima, Japan, Nov. 28-Dec. 1, 2016; 6 pages.

Cadena, C. et al. (Dec. 2016). "Past, Present, and Future of Simultaneous Localization and Mapping: Towards the Robust-Perception Age," *IEEE Transactions on Robots*, vol. 32, issue 6; pp. 1309-1332.

Zlot, R. et al. "Multi-Robot Exploration Controlled by a Market Economy," *2002 IEEE International Conference on Robotics and Automation (ICRA '02)*, Washington, DC, May 11-15, 2002; 10 pages.

Franchi, A. et al. "Distributed Online Leader Selection in the Bilateral Teleoperation of Multiple UAVs," 2011 *50th IEEE Conference on Decision and Control and European Control Conference (CDC-ECC)*, Orlando, FL, Dec. 12-15, 2011; 7 pages.

Soni, J. et al. "Prediction of Component Failures of Telepresence Robot with Temporal Data," *30th Florida Conference on Recent Advances in Robotics*, Boca Raton, FL, May 11-12, 2017; 4 pages.

\* cited by examiner

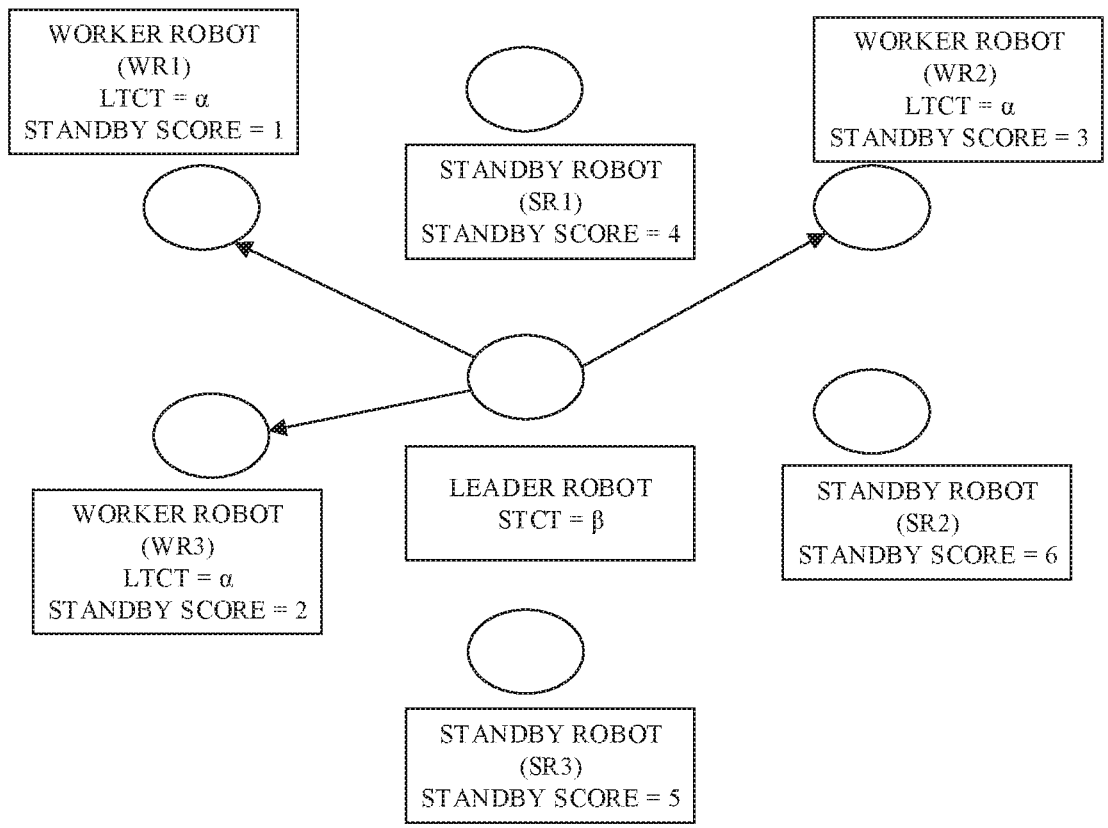
FIG. 3A — 300A

SYSTEM AND METHOD FOR EXECUTING FAULT-TOLERANT SIMULTANEOUS LOCALIZATION AND MAPPING IN ROBOTIC CLUSTERS

PRIORITY CLAIM

This U.S. patent application claims priority under 35 U.S.C. § 119 to India Patent Application No. 201721026550, filed on Jul. 26, 2017. The entire contents of the aforementioned application are incorporated herein by reference.

TECHNICAL FIELD

The embodiments herein generally relate to simultaneous localization and mapping (SLAM) in robotic clusters and, more particularly, to fault-tolerant SLAM in the robotic clusters.

BACKGROUND

Typically, autonomous robots are capable of concurrent map building of the environment and estimating their relative location, generally termed as simultaneous localization and mapping (SLAM) problem. In an era when commodity hardware is replacing costly, specialized hardware in most scenarios, software reliability within cloud robotic middleware may allow its distributed execution on lightweight, low cost robots and network edge devices. However successful functioning of multi-robot systems in critical missions requires resilience in the middle-ware such that the overall functioning degrades gracefully in the face of hardware failure and connectivity failure to the cloud server. Even, multi-robot cooperative SLAM provides reliability, but orienting and merging of maps built by different robot may be both processing and memory intensive task and hence, may not be suitable in a robotic cluster. Also, a failure of a primary robot terminates the map building process leading to failure of the SLAM process.

SUMMARY

Embodiments of the present disclosure present technological improvements as solutions to one or more of the above-mentioned technical problems recognized by the inventors in conventional systems. In view of the foregoing, embodiments herein provide methods and systems for fault-tolerant simultaneous localization and mapping in robotic clusters.

In one embodiment, a processor-implemented method includes steps of: receiving distributed simultaneous localization and mapping (SLAM) by at least a part of a robotic cluster, wherein the robotic cluster comprises a leader robot and member robots, wherein the member robots comprise worker robots and a few standby robots in order among the worker robots; calculating reliability of the leader robot based on associated components while performing tasks of the distributed SLAM; determining at least one of a self-task completion time (STCT) value for each of the tasks of the leader robot by the leader robot and a leader's task completion time (LTCT) value for each of the tasks of the leader robot by each of the worker robots when the reliability of the leader robot is less than a predefined threshold; predicting failure of the leader robot based on the determined at least one of the LTCT value and the STCT value; and performing hand-over of the tasks of the leader robot to one of the member robots upon predicting the failure of the leader robot, thereby executing fault-tolerant distributed SLAM.

In another embodiment, a system for fault-tolerant SLAM in robotic clusters is provided. The system includes a cloud based infrastructure and a robotic cluster communicatively coupled to the cloud based infrastructure, wherein the robotic cluster comprises a leader robot and member robots having worker robots and and a few standby robots in order among the worker robots, wherein the leader robot and each of the member robots receive distributed simultaneous localization and mapping (SLAM) from the cloud based infrastructure, wherein the leader robot and the member robots calculate reliability based on associated components while performing the distributed SLAM, wherein each of the worker robots determines a corresponding leader's task completion time (LTCT) value for a task when the reliability of the leader robot is less than a predefined threshold or the leader robot determines a corresponding self-task completion time (STCT) value, and wherein performing one of: one of the member robots predicts failure of the leader robot when the LTCT value of the worker robots is greater than a predetermined LTCT limit value and takes over leader robot's tasks; and the leader robot predicts the failure when the corresponding STCT value is greater than a predetermined STCT limit value and assigns the leader robot's tasks to one of the member robots, thereby executing fault-tolerant SLAM.

In yet another embodiment, a non-transitory computer-readable medium having embodied thereon a computer program for executing a method for fault-tolerant SLAM in robotic clusters is provided. The method includes the steps of: receiving distributed simultaneous localization and mapping (SLAM) by at least a part of a robotic cluster, wherein the robotic cluster comprises a leader robot and member robots, where the member robots comprise worker robots and and a few standby robots in order among the worker robots; calculating reliability of the leader robot based on associated components while performing tasks of the distributed SLAM; determining at least one of a self-task completion time (STCT) value for each of the tasks of the leader robot by the leader robot and a leader's task completion time (LTCT) value for each of the tasks of the leader robot by each of the worker robots when the reliability of the leader robot is less than a predefined threshold; predicting failure of the leader robot based on the determined at least one of the LTCT value and the STCT value; and performing hand-over of the tasks of the leader robot to one of the member robots upon predicting the failure of the leader robot, thereby executing fault-tolerant distributed SLAM.

It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this disclosure, illustrate exemplary embodiments and, together with the description, serve to explain the disclosed principles.

FIGS. 3A-3C illustrates a member robot taking over leader's workflow, in accordance with an example embodiment.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A technique for fault-tolerant simultaneous localization and mapping (SLAM) in robotic clusters is disclosed. In this technique, robotic localization and mapping SLAM is executed in a resource constrained robotic cluster such that the distributed SLAM is executed in a reliable fashion and self-healed in case of failure of active robots. To ensure fault tolerance, the robots are enabled, by time series analysis of internal components including but not limited to motors, bearings and sensors, to find their individual failure probabilities and use that to enhance cluster reliability in a distributed manner.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for fault-tolerant SLAM in robotic clusters, has been explained in details with respect to the FIGS. 1 through 5. While aspects of described methods and systems for fault-tolerant SLAM in robotic clusters can be implemented in any number of different systems, utility environments, and/or configurations, the embodiments are described in the context of the following exemplary system(s).

Figure 1:
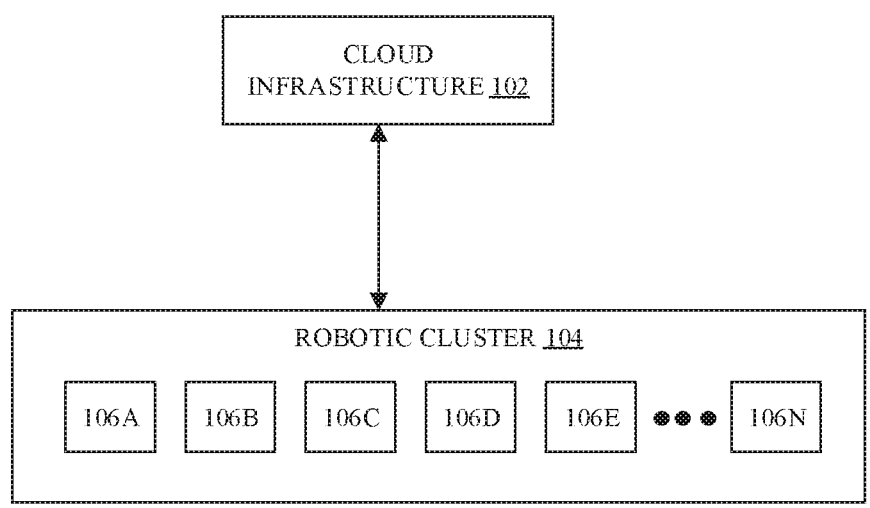
FIG. 1 illustrates a block diagram of a system for fault-tolerant simultaneous localization and mapping (SLAM) in robotic clusters, in accordance with an example embodiment.
Figure 2:
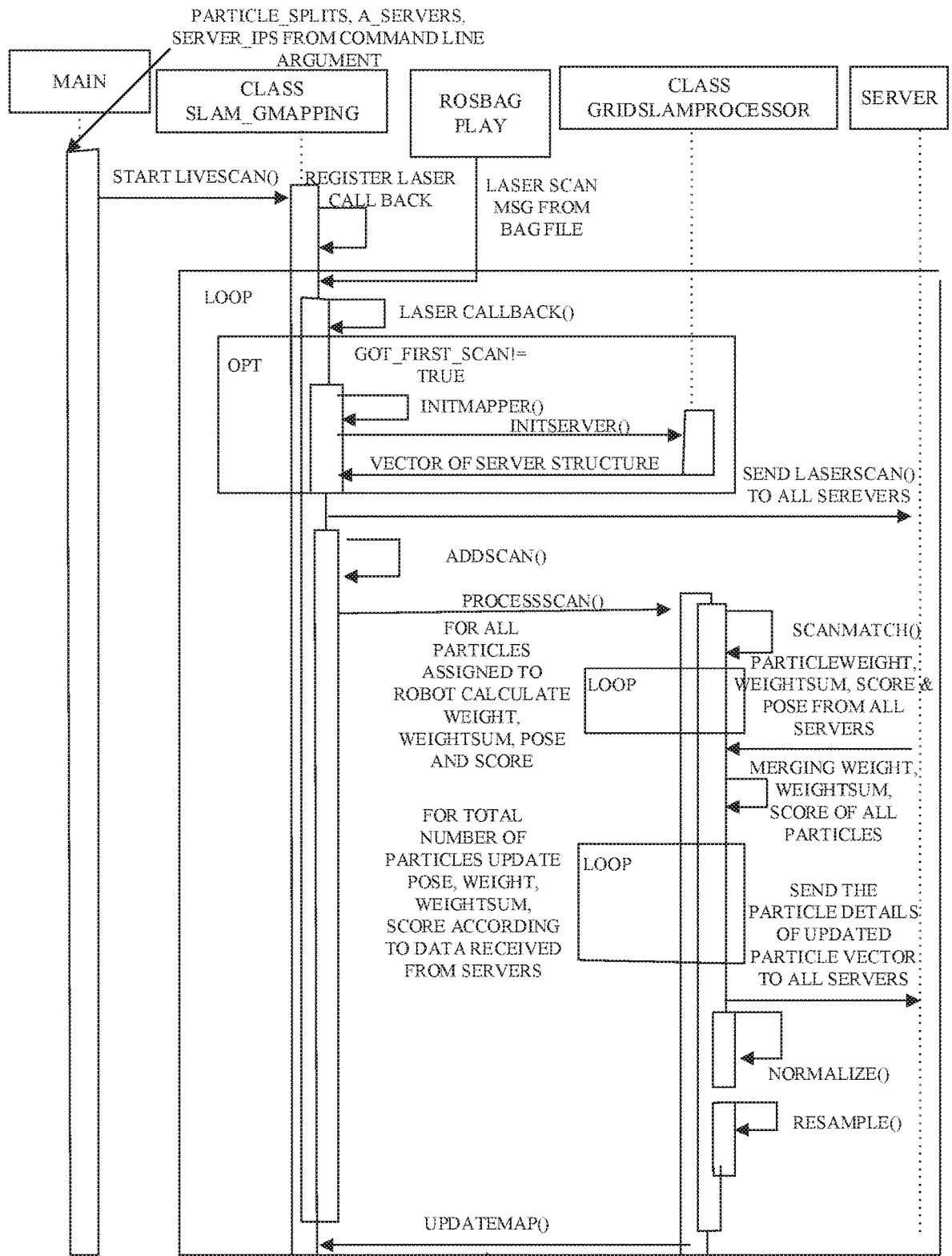
FIG. 2 illustrates a sequence diagram of collaborating classes in a robot, in accordance with an example embodiment.
Figure 3B:
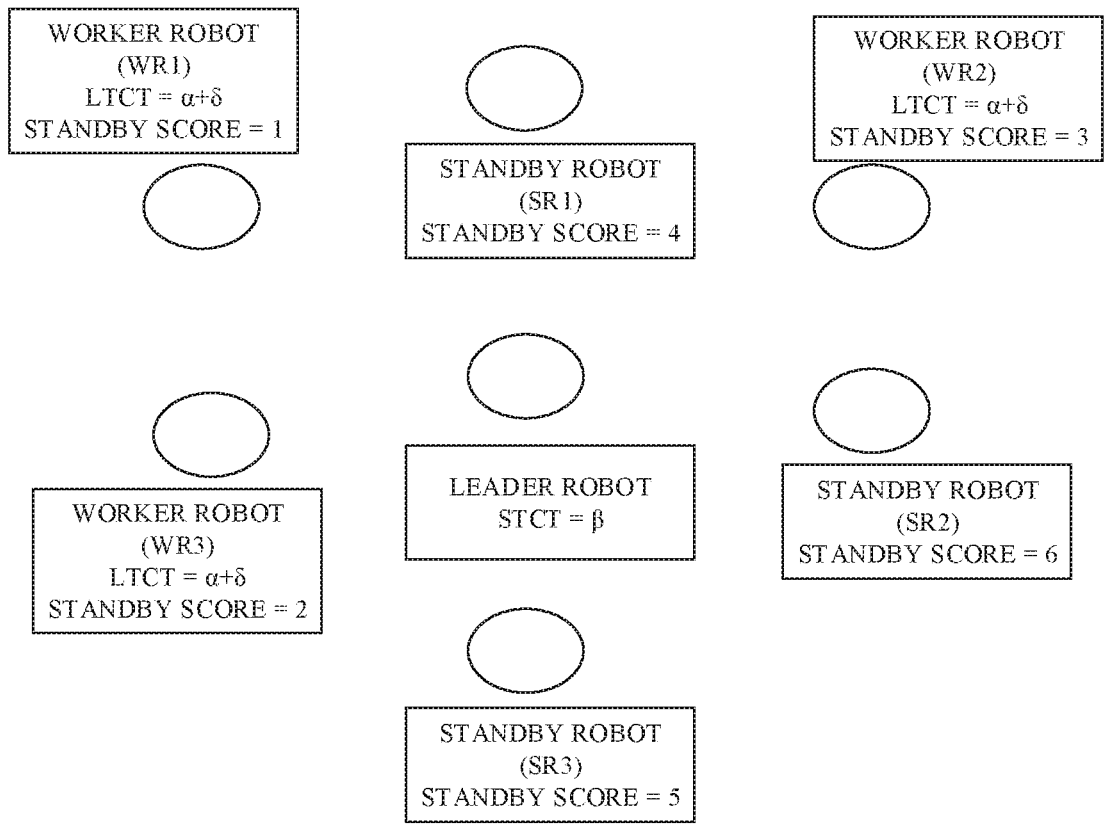
Figure 3C:
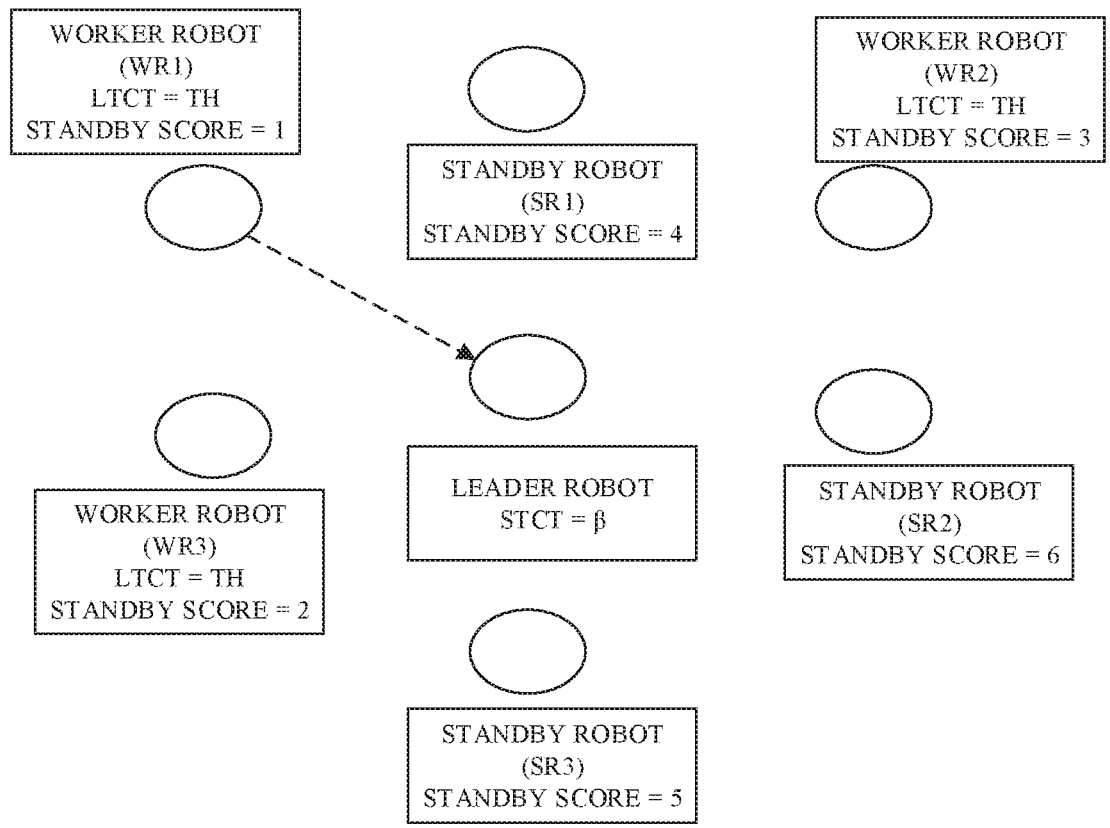

FIG. 1 illustrates a block diagram of a system 100 for fault-tolerant SLAM in robotic clusters, in accordance with an example embodiment. As shown in FIG. 1, the system 100 includes a cloud infrastructure 102 and a robotic cluster 104 communicatively coupled with the cloud infrastructure 102. Further, the robotic cluster 104 includes a plurality of robots 106A-N. In some example, the plurality of robots include a leader robot, worker robots and a few standby robots in order among the worker robots.

The robots 106A-N include or is otherwise in communication with one or more hardware processors such as processor(s), one or more memories, and a network interface unit such as a network interface unit. In an embodiment, the processor, memory, and the network interface unit may be coupled by a system bus such as a system bus or a similar mechanism. The processor may include circuitry implementing, among others, audio and logic functions associated with the communication. For example, the processor may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor thus may also include the functionality to encode messages and/or data or information. The processor may include, among other things, a clock, an arithmetic logic unit (ALU) and logic gates configured to support operation of the processor. Further, the processor may include functionality to execute one or more software programs, which may be stored in the memory or otherwise accessible to the processor.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) may include a variety of software and hardware interfaces, for example, interfaces for peripheral device(s), such as a keyboard, a mouse, an external memory, and a printer. The interface(s) can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory, may store any number of pieces of information, and data, used by the system to implement the functions of the system. The memory 204 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory may be configured to store information, data, applications, instructions or the like for enabling the corresponding robot to carry out various functions in accordance with various example embodiments. Additionally or alternatively, the memory may be configured to store instructions which when executed by the processor causes the corresponding robot to behave in a manner as described in various embodiments. The memory includes routines, programs, objects, components, data structures, etc., which perform particular tasks or implement particular abstract data types. The memory may also include programs or coded instructions that supplement applications and functions of the corresponding robot.

In operation, the cloud infrastructure 102 distributes and parallelizes SLAM for making its execution reliable in the robotic cluster 104. Generally, SLAM is a primary requirement for the robots 106A-N exploring unknown environments and is built-into the robot middleware. For example, in a standard robotic workflow—one robot may perform unloading from a vehicle and put in a conveyor belt (task1) and another robot picks from the belt and puts it in a rack (task2). As task1 and task2 are two different tasks, it can be assigned to two different robots. As SLAM is built-into the middleware of individual robot, it cannot be partitioned naively and parts of SLAM for one robot cannot be assigned to others. To make this workflow reliable, a modified scan based SLAM is used. A SLAM algorithm that implements Rao Blackwellized Particle Filter (RBPF) to solve the SLAM problem where each particle represents a possible robot trajectory and a map, is used. In order to speed up the map building process, it is required to parallelize the algorithm by running several instances of the algorithm in external servers. Offloading the resource intensive scan matching routine to different servers provides a key solution towards parallelization. The SLAM algorithm corrects the robot pose and importance weights of each state variable (particle) in scan matching directly, where the importance of each particle is calculated based on the likelihood of the current observation, given the predicted robot position for each particle and the weight normalization is only required for re-sampling particles. The particles are, transmitted to each participating worker by a leader robot (leader) among the participant robots of the robot cluster when it performs a scan. The particles are received by one or worker robots (workers) in the robot cluster, wherein the reception of the particles is in a serialized form. Thus, the serialized particles are deserialized by a worker robot. The deserialized details are populated in an ordered sequence in a loop. The parallelization strategy used here is that both the leader and other robots maintain full information about the particles, but processes only a set of assigned particles. This approach of distributed execution results in availability of full state information and data (map) in each of the robots 106A-N, making any of these ready for taking over in case a leader robot (e.g., 106A) fails (i.e., low data transfer). For example, there are several factors that account for an unreliable and faulty system. It includes individual robot malfunctions like motor failure, sensor failure and odometry failure, local perspectives that are globally incoherent, interference, software errors or incompleteness and communication failures. The SLAM task can execute, albeit slowly, even if all the robots 106B-N except the leader robot 106A fails. Thus it can be modeled as a 1-out-of-n: G, i.e., a parallel system. In contrast a robot fails when any one of its module fail (1-out-of-n: F) i.e., series system. For example, updates done to the original sequential SLAM algorithm (as shown in a sequential diagram of collaborating classed in a robot for modified SLAM algorithm 200 of FIG. 2) to make it reliable are as follows:

At a leader robot (in a loop):
1. Broadcast leader's odometry and scan to peers.
2. Predict self-pose from odometry using a motion model.
3. For all particles assigned to it, perform scan matching, correct pose and update weights.
4. Get corrected poses and weights for assigned particles to peers, within a timeout.
5. Merge and create complete scan match result from peers.
6. Set standby list using standby score.
7. Broadcast scan match result (pose+weight) and standby list to peers.
8. Perform weight normalization, re-sampling and map update.

At other robots (in a loop):
1. Get current pose and scan of leader robot.
2. If latest scan is not available from the leader robot till a timeout and this is the next standby, navigate physically to leader robot's last known location using the known map built so far and re-start leader's work-flow (given above).
3. If not a standby, wait for a different timeout till scan arrives.
4. Predict initial leader robot pose from odometry using a motion model.
5. For all particles assigned to it, perform scan matching, correct pose and update weights.
6. Send corrected poses and weights for assigned particles to leader.
7. Receive merged scan match result (pose+weight) and standby list from the leader robot till timeout, else take over as in step 2.
8. Perform weight normalization, resampling and map update.
9. Localize itself on the current map.

In an example implementation, the leader robot 106A and the member robots 106B-N calculate reliability based on associated components while performing the distributed SLAM. In an embodiment, reliability can be defined as the probability that the robot may function properly at a given time and can be specified as R(t)=1−F(t), where R(t) and F(t) represents reliability and failure probability at a given time t respectively. In this embodiment, a robot calculates its reliability using an example equation:

$$R_i = \prod_{j=1}^{M} R_j$$

where $R_i$ represents reliability of $i^{th}$ robot, $R_j$ represents reliability of $j^{th}$ module of the $i^{th}$ robot and M is a number of modules in the $i^{th}$ robot.

For example, the reliability of a module can be affected by various hazards like temperature, load and so on. Therefore, a metric used for calculating the reliability is mean time to failure (MTTF) which can be computed as:

MTTF=$\int_0^\infty R(t)dt$

Further, each of the member robots 106B-N computes a corresponding standby score based on the associated calculated reliability. In en example embodiment, each of the member robots 106B-N determines corresponding failure probability F(t) using the associated calculated reliability. The, the robots 106B-N computes corresponding standby score using the failure probability. In an example, a robot calculates its standby score using a following equation:

Standby score=$\xi t + \mu F(t)$ where t and F(t) represent time to yield a current task and robot failure probability calculated using time series prediction, respectively and $\xi$ and $\mu$ are constants determined by the user based on weightage given to delay and failure probability of the robot.

In an embodiment, each of worker robots (e.g., 106B-D) determines a corresponding leader's task completion time (LTCT) value for a task when the reliability of the leader robot 106A is less than a predefined threshold. For example, an LTCT value of a worker robot increases based on a time waited by the worker robot for the leader robot to finish a task and does not get any communication from the leader robot 106A. The LTCT value is a measurement for failure determination of the leader robot 106A which is actively doing a task, by other possible worker robots 106B-D. Moreover, one of the member robots 106B-N predicts failure of the leader robot 106A (actual failure occurred) when the LTCT value of the worker robots 106B-D is greater than a predetermined LTCT limit value and takes over leader robot's tasks. For example, the one of the member robots having least standby score takes over the leader robot's tasks. The selected robot, aware of its own location and the leader robot's location, navigates to the position of the leader robot, assumes its pose and continues the SLAM from the next scan onwards.

In an example, consider a robotic cluster consisting of a leader robot, worker robots (WR1, WR2 and WR3) and next standby robots (SR1, SR2 and SR3). Initially, the worker robots have an LTCT value of a and the leader robots have self-task completion time (STCT) value of β and all the robots have a standby score that is calculated from the standby score. Here the standby score is derived only from the delay to accomplish the present task and no failure probability is calculated (assumed to be zero). In state 1, as shown in the illustration 300A of FIG. 3A, the leader robot is functional and sends messages to the worker robots. In state 2, as shown in the illustration 300B of FIG. 3B, the leader robots fails and stops sending any message to the worker robots. As a result the LTCT value of the worker robots increase by a value δ. With time, the LTCT value reaches a threshold value as shown in the illustration 300C of FIG. 3C, and the robot (e.g., WR1) with a lowest standby score takes over the leader's work-flow.

In another embodiment, the leader robot 106A determines a corresponding STCT value. The STCT value of the leader robot increases based on a time taken by the leader robot to perform a task. Further, the leader robot 106A predicts the failure when the corresponding STCT value is greater than a predetermined STCT limit value and assigns the leader robot's tasks to one of the member robots having least standby score.

In an example scenario, a fault prediction module residing in the memory of a leader robot helps in calculating its failure probability. Here hardware related failures like odometry failure and laser failure are considered. Also, it is assumed that execution data of sensors or hardware like motor bearing is available by fitting additional external sensors. The fault is predicted from a time-series of execution data using a Support Vector Regression (SVR) model.

The objective function of the SVR is to minimize $\frac{1}{2}\|w\mu^2$ subjected to the following constraints:

$y_i - \langle w, x_i \rangle - b \leq \varepsilon$ $\langle w, x_i \rangle + b - y_i \leq \varepsilon$ where $x_i$ and $y_i$ denote the training data and label, respectively. The summation of inner product $x_i$ and intercept b is the predicted value should lie within the specified threshold $\varepsilon$.

Figure 4A:
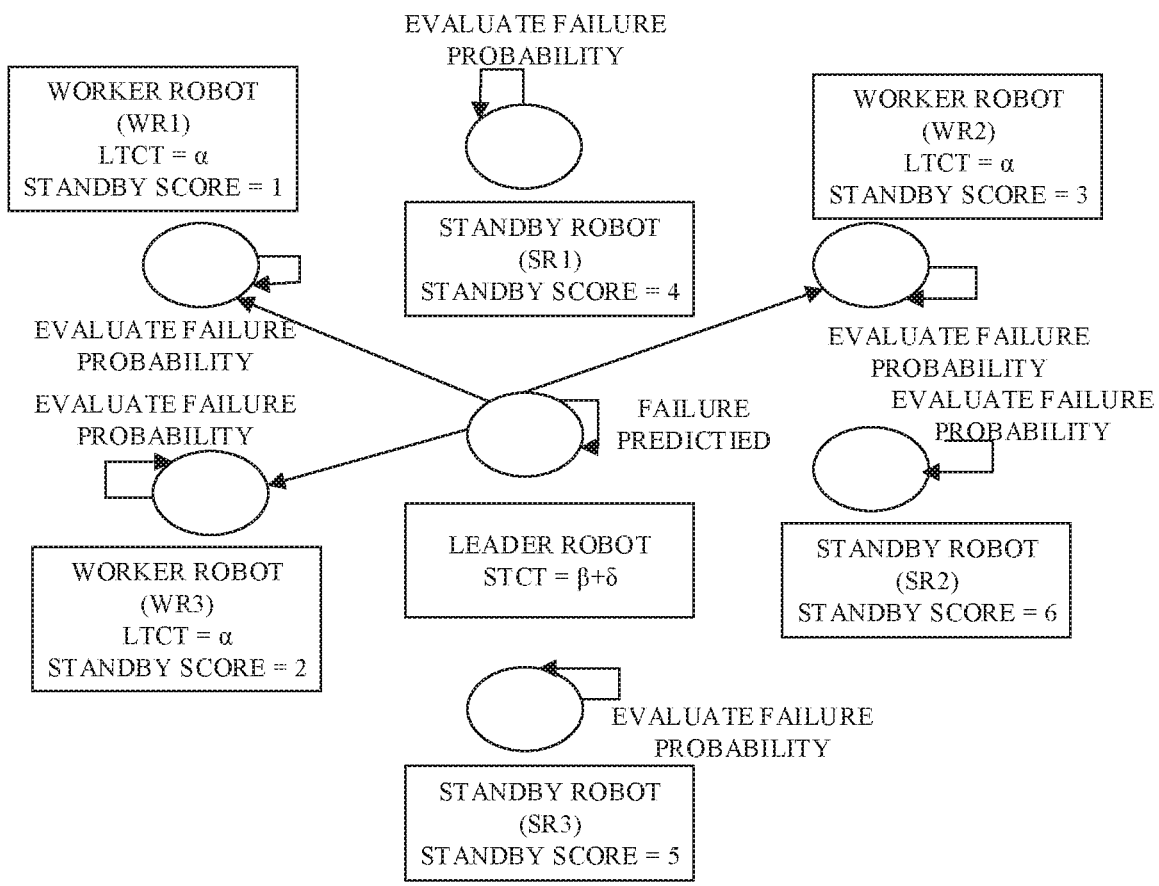
FIGS. 4A-4B illustrates a leader robot assigning over leader's workflow to a member robot, in accordance with an example embodiment.
Figure 4B:
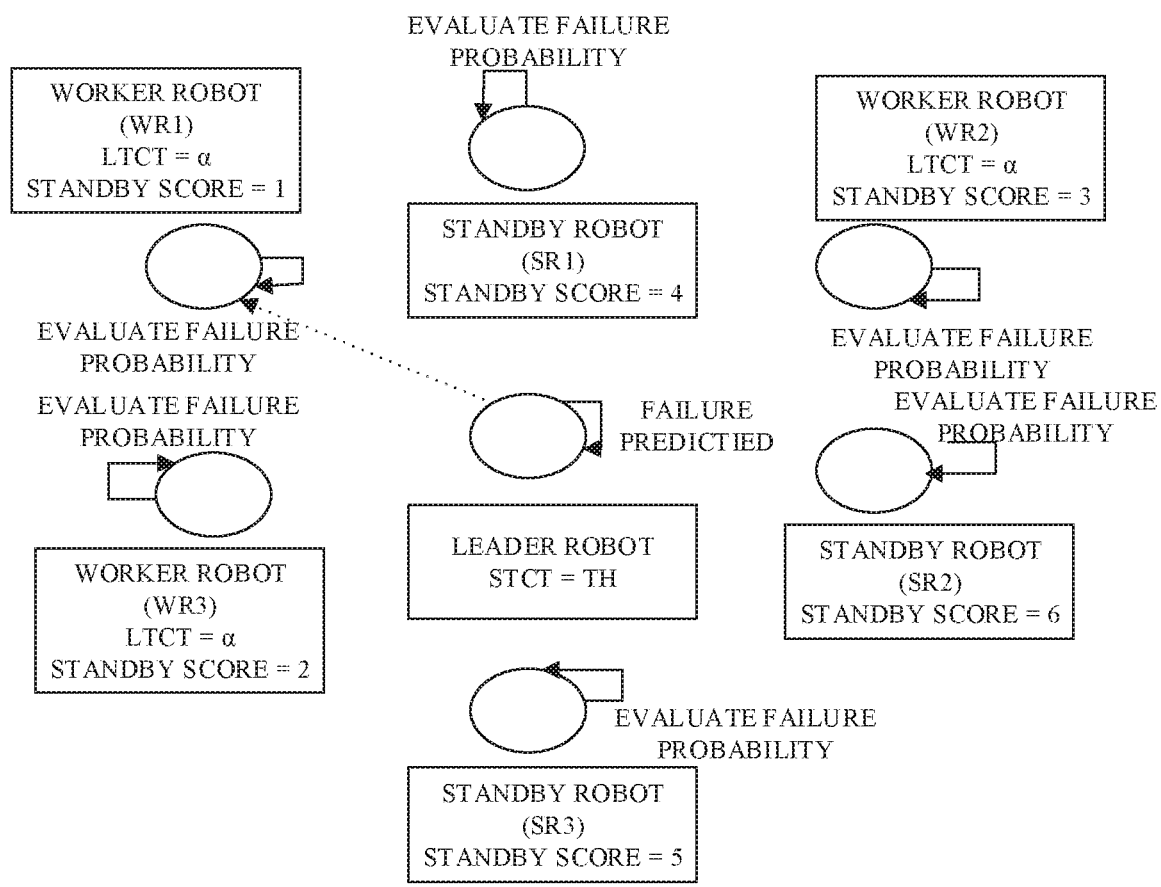

In state 1, as shown in the illustration 400A of FIG. 4B, the leader robot predicts a failure (it may be a sensor or actuator or component (e.g., motor bearing, wheel and so on) failure). As a result the STCT value is increased by a value δ. After a certain time, the STCT value reaches a predetermined limit value (i.e., threshold value) and the recovery mechanism is initiated by the leader robot itself using the contract net protocol (CNP), as shown in the illustration 400B of FIG. 4B. According to the protocol, the leader robot broadcasts an announcement that includes the specification of the task to be done. On receiving the announcement the worker robots WR1-3 and standby robots SR1-3 bid using their standby score. The leader robot assigns the leader's tasks to the robot bidding the lowest standby score.

Figure 5:
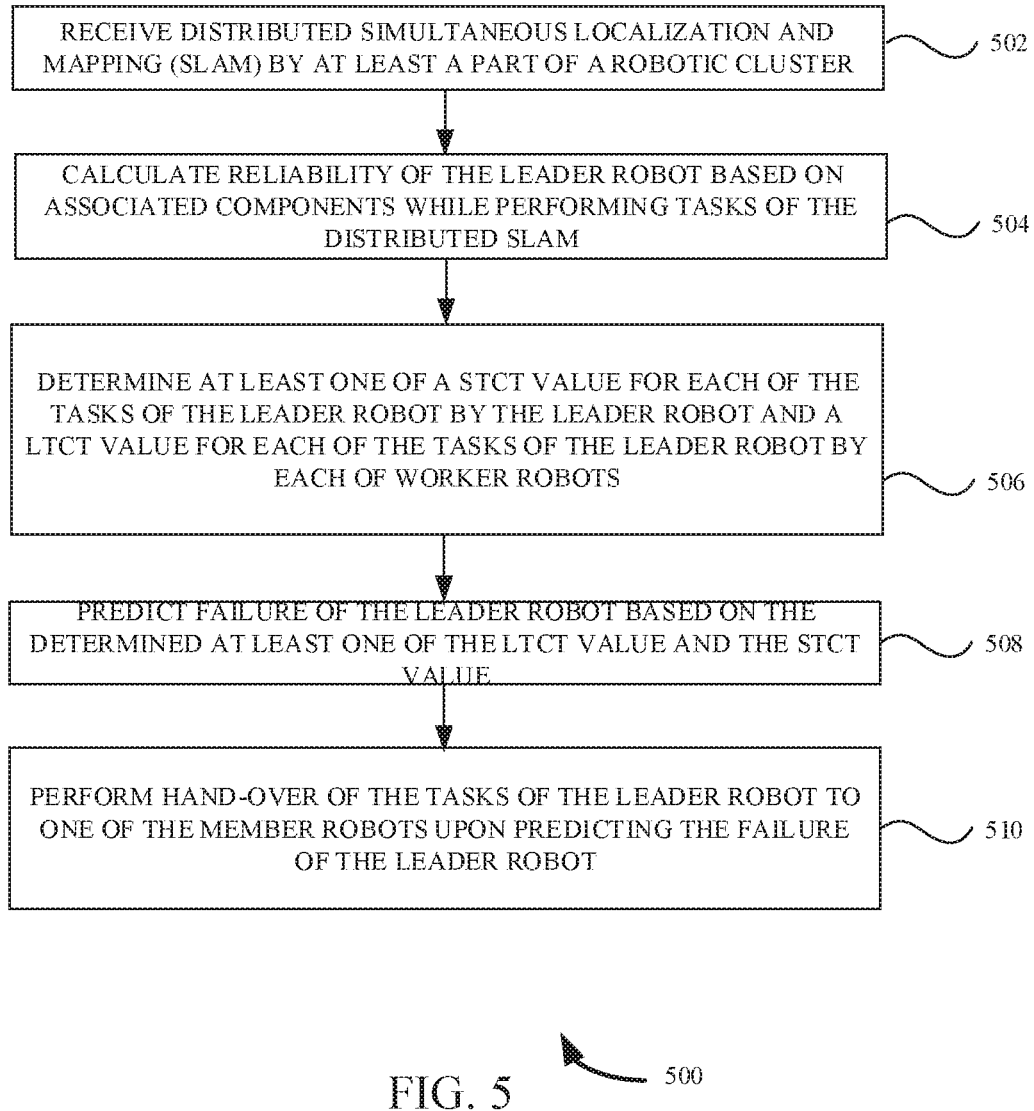
FIG. 5 illustrates a flow diagram of a method for fault-tolerant SLAM in robotic clusters, in accordance with an example embodiment.

FIG. 5 illustrates a flow diagram of a method for fault-tolerant SLAM in robotic clusters, in accordance with an example embodiment. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof. In an embodiment, the method 500 depicted in the flow chart may be executed by a system, for example, system 100 of FIG. 1.

At block 502, distributed simultaneous localization and mapping (SLAM) is received by at least a part of a robotic cluster. For example, the robotic cluster includes a leader robot and member robots, wherein the member robots include worker robots and and a few standby robots in order among the worker robots. Basically, the distributed SLAM is received by the leader robot and workers robot. At block 504, reliability of the leader robot is calculated based on associated components while performing tasks of the distributed SLAM. At block 506, at least one of a self-task completion time (STCT) value for each of the tasks of the leader robot by the leader robot and a leader's task completion time (LTCT) value for each of the tasks of the leader robot by each of the worker robots is determined when the reliability of the leader robot is less than a predefined threshold. For example, an LTCT value of a worker robot increases based on a time waited by the worker robot for the leader robot to finish a task and wherein the STCT value of the leader robot increases based on a time taken by the leader robot to perform a task.

At block 508, failure of the leader robot is predicted based on the determined at least one of the LTCT value and the STCT value. In an example implementation, failure of the leader robot is predicted when the STCT value of each of the worker robots is greater than a predetermined STCT limit value. In another example implementation, failure of the leader robot is predicted when the LTCT value of the leader robot is greater than a predetermined LTCT limit value.

At block 510, hand-over of the tasks of the leader robot to one of the member robots is performed upon predicting the failure of the leader robot, thereby executing fault-tolerant distributed SLAM. In an embodiment, the leader robot's tasks is taken over by the one of the member robots when the failure of the leader robot is predicted based on the LTCT value of each of the worker robots. In another embodiment, the leader robot's tasks is assigned by the leader robot to the one of the member robots when the failure of the leader robot is predicted based on the STCT value of the leader robot. In these embodiments, reliability each of the member robots is calculated based on associated components while performing the distributed SLAM. Further, a standby score of each of the member robots is computed based on the associated calculated reliability. Furthermore, hand-over of the tasks of the leader robot to the one of the member robots is performed based on corresponding standby score. In an example implementation, the tasks of the leader robot are handed over to the one of the member robots having least standby score. The order in which the method(s) are described is not intended to be construed as a limitation, and any number of the described method blocks can be combined in any order to implement the method 500, or an alternative method. Additionally, individual blocks may be deleted from the methods without departing from the spirit and scope of the subject matter described herein. Furthermore, the method 500 can be implemented in any suitable hardware, software, firmware, or combination thereof.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method comprising:
    receiving distributed simultaneous localization and mapping (SLAM) by at least a part of a robotic cluster, wherein the robotic cluster comprises a leader robot and member robots, wherein the member robots comprise worker robots and standby robots;
    calculating reliability of the leader robot based on associated components while performing tasks of the distributed SLAM;
    determining at least one of a self-task completion time (STCT) value for each of the tasks of the leader robot by the leader robot and a leader's task completion time (LTCT) value for each of the tasks of the leader robot by each of the worker robots when the reliability of the leader robot is less than a predefined threshold;
    predicting failure of the leader robot based on the determined at least one of the LTCT value and the STCT value; and
    performing hand-over of the tasks of the leader robot to one of the member robots upon predicting the failure of the leader robot, thereby executing fault-tolerant distributed SLAM, wherein performing hand-over of the tasks of the leader robot to the one of the member robots comprises:
        calculating reliability of each of the member robots based on associated components while performing the distributed SLAM;
        computing a standby score of each of the member robots based on the associated calculated reliability; and
        performing hand-over of the tasks of the leader robot to the one of the member robots based on corresponding standby score.

2. The method of claim 1, wherein an LTCT value of a worker robot increases based on a time waited by the worker robot for the leader robot to finish a task and wherein the STCT value of the leader robot increases based on a time taken by the leader robot to perform a task.

3. The method of claim 1, wherein predicting failure of the leader robot based on the determined at least one of the LTCT value and the STCT value, comprises:
performing one of:
predicting failure of the leader robot when the STCT value of each of the worker robots is greater than a predetermined STCT limit value; and
predicting failure of the leader robot when the LTCT value of the leader robot is greater than a predetermined LTCT limit value.

4. The method of claim 1, wherein performing hand-over of the tasks of the leader robot tasks to the one of the member robots upon predicting the failure of the leader robot, comprises:
performing one of:
taking over the leader robot's tasks by the one of the member robots when the failure of the leader robot is predicted based on the LTCT value of each of the worker robots; and
assigning the leader robot's tasks by the leader robot to the one of the member robots when the failure of the leader robot is predicted based on the STCT value of the leader robot.

5. The method of claim 1, wherein performing hand-over of the tasks of the leader robot to the one of the member robots based on corresponding standby score, comprises:
performing hand-over of the tasks of the leader robot to the one of the member robots having least standby score.

6. A system, comprising:
a cloud based infrastructure; and
a robotic cluster communicatively coupled to the cloud based infrastructure, wherein the robotic cluster comprises a leader robot and member robots having worker robots and standby robots, wherein the leader robot and each of the member robots receive distributed simultaneous localization and mapping (SLAM) from the cloud based infrastructure, wherein the leader robot and the member robots calculate reliability based on associated components while performing the distributed SLAM, wherein each of the member robots computes a corresponding standby score based on the associated calculated reliability and the one of the member robots having least standby score takes over the leader robot's tasks, wherein each of the worker robots determines a corresponding leader's task completion time (LTCT) value for a task when the reliability of the leader robot is less than a predefined threshold or the leader robot determines a corresponding self-task completion time (STCT) value, and wherein performing one of:
one of the member robots predicts failure of the leader robot when the LTCT value of the worker robots is greater than a predetermined LTCT limit value and takes over leader robot's tasks; and
the leader robot predicts the failure when the corresponding STCT value is greater than a predetermined STCT limit value and assigns the leader robot's tasks to one of the member robots, thereby executing fault-tolerant SLAM.

7. The system of claim 6, wherein an LTCT value of a worker robot increases based on a time waited by the worker robot for the leader robot to finish a task and wherein the STCT value of the leader robot increases based on a time taken by the leader robot to perform a task.

8. A non-transitory computer readable medium embodying a program executable in a computing device, said program comprising:
a program code for receiving distributed simultaneous localization and mapping (SLAM) by at least a part of a robotic cluster, wherein the robotic cluster comprises a leader robot and member robots, wherein the member robots comprise worker robots and standby robots;
a program code for calculating reliability of the leader robot based on associated components while performing tasks of the distributed SLAM;
a program code for determining at least one of a self-task completion time (STCT) value for each of the tasks of the leader robot by the leader robot and a leader's task completion time (LTCT) value for each of the tasks of the leader robot by each of the worker robots when the reliability of the leader robot is less than a predefined threshold;
a program code for predicting failure of the leader robot based on the determined at least one of the LTCT value and the STCT value; and
a program code for performing hand-over of the tasks of the leader robot to one of the member robots upon predicting the failure of the leader robot, thereby executing fault-tolerant distributed SLAM, wherein performing hand-over of the tasks of the leader robot to the one of the member robots comprises:
calculating reliability of each of the member robots based on associated components while performing the distributed SLAM;
computing a standby score of each of the member robots based on the associated calculated reliability; and
performing hand-over of the tasks of the leader robot to the one of the member robots based on corresponding standby score.

* * * * *